United States Patent [19]
Larsson et al.

[11] Patent Number: 5,537,428
[45] Date of Patent: Jul. 16, 1996

[54] ARRANGEMENT FOR BIT ERROR MONITORING IN SWITCHING EQUIPMENT

[75] Inventors: Leif M. Larsson, Stockholm; Eva C. Westerlund, Gustafsberg; Kerstin E. Albåge, Bromma; Raimo K. Sissonen, Sundbyberg, all of Sweden

[73] Assignee: Telefonaktiebolaget L M Ericsson, Stockholm, Sweden

[21] Appl. No.: 145,627

[22] Filed: Nov. 4, 1993

[30] Foreign Application Priority Data

Nov. 24, 1992 [SE] Sweden ........................... 9203528

[51] Int. Cl.⁶ ............................................. G06F 11/10
[52] U.S. Cl. ...................... 371/37.1; 371/37.7; 370/94.1
[58] Field of Search ............................. 371/37.1, 49.3, 371/37.7, 53, 49.1; 370/94.1

[56] References Cited

U.S. PATENT DOCUMENTS

| | | | |
|---|---|---|---|
| 4,451,827 | 5/1984 | Kahn et al. | 370/94.1 |
| 4,507,782 | 3/1985 | Kunimasa et al. | 371/32 |
| 4,712,214 | 12/1987 | Meltzer et al. | 371/32 |
| 4,862,461 | 8/1989 | Blaner | 371/33 |
| 5,010,553 | 4/1991 | Scheller et al. | 371/35 |
| 5,119,370 | 6/1992 | Terry | 370/60.1 |
| 5,130,984 | 7/1992 | Cisneros | 370/94.1 |
| 5,182,752 | 1/1993 | De Roo et al. | 371/37.7 |
| 5,184,347 | 2/1993 | Farwell et al. | 370/94.1 |

FOREIGN PATENT DOCUMENTS 0482550 4/1992 European Pat. Off. .

*Primary Examiner*—Paul P. Gordon
*Attorney, Agent, or Firm*—Burns, Doane, Swecker & Mathis

[57] ABSTRACT

A device for checking bit errors occurring in datacells, used in switching equipment which forms part of a telecommunication system, includes an error discovery unit to detect bit errors occurring within an information carrying part of a datacell, and a counter and a processor unit to note the bit error in a bit error recording unit. The error discovery unit can also be used to amend the information carrying part and/or correct the bit error.

23 Claims, 3 Drawing Sheets

005,537,428

ARRANGEMENT FOR BIT ERROR MONITORING IN SWITCHING EQUIPMENT

TECHNICAL FIELD

The present invention relates to an arrangement for monitoring bit errors in switching equipment.

The switching equipment referred to is included in a telecommunication system and may conveniently have the form of packet switching equipment.

The switching equipment to which the invention refers is of the kind to which a number of incoming links are connected via first switch ports and a number of outgoing links are connected via second switch ports, and which includes the necessary control means and coupling devices for connecting an incoming link with an indicated outgoing link, where indication of the outgoing link is initiated by signals occurring in the form of one or more data cells on an incoming link.

These data cells are normally standardized and have a constant length which includes an address carrying first section and an information-carrying second section, where the first section includes a first subsection for identification of a destination address, and a second subsection which includes a check sum which is adapted to detect bit errors that occur in the first subsection.

DESCRIPTION OF THE PRIOR ART

Several different designs of switching equipment in the form of packet switches of the aforedescribed general construction are known to the art.

It is known to control a packet switch with the aid of the virtual destination address which can be pointed-out in the first address carrying section of the data cell and that, to this end, a table is looked-up in a memory each time information relating to the desired destination address is required to effect said control, via the control means.

Packet switches constructed in accordance with an ATM-system (Asynchronous Transfer Mode) and with which the present invention finds particular application are also known to the art.

In the case of switching equipment of the aforedescribed kind, which is controlled with the aid of data cells of standardized format, it is known to form solely for the first address carrying subsection a check sum that can be inserted in the second subsection, which is adapted to discover the occurrence of bit errors in the first subsection with the aid of a particularly chosen algorithm.

If a bit error is discovered in the first subsection, this will normally be considered sufficiently serious to necessitate scrapping of the whole data cell, since such a bit error normally implies that the address of the data cell is wrong, and since it is a serious disadvantage to allow wrongly addressed data cells to pass in switching equipment of the aforedescribed kind.

In the case of known systems, it has rightly been considered unnecessary to scrap data cells which contain bit errors solely in the second information-carrying section, since the drawbacks introduced by such errors are insignificant.

SUMMARY OF THE PRESENT INVENTION

TECHNICAL PROBLEMS

When studying the background art as described above, it will be seen that a technically qualified consideration and a technical problem is one of realizing that the advantages gained by monitoring a bit error in the second information-carrying section in packet-type switching equipment outweighs the disadvantages of introducing supplementary bit error supervising means in said equipment.

When considering the aforedescribed prior art, it will also be seen that a technical problem associated with the necessary internal signal control within such switching equipment resides in realizing the simplifications and advantages that are associated with also monitoring or supervising bit errors in the second information-carrying section and therewith realizing the options that will be afforded in dependence on the structure of the discovered bit error regarding the possible procedures that are available.

It will thus be seen that a technical problem resides in realizing the simplification that can be achieved in the control function of the switching equipment by choosing one of the following possible procedures when a bit error is detected in the second bit error monitoring section:

Supplementing the bit configuration in the relevant section in accordance with the structure of the bit error; and/or
correcting an occurring bit error in accordance with the structure of said error; and/or
alternatively simply marking that the second information-carrying section contains a bit error, in one position in the data cell.

It will also be seen that a technical problem resides in realizing the simplification of the switching equipment control system that can be achieved solely by providing more comprehensive monitoring for possible bit errors in the whole of the data cell.

It will also be seen that a technical problem is one of realizing the significance of monitoring the occurrence of a bit error in the second information-carrying section with the aid of a check sum determined by a chosen polynomial, or by evaluating parity bits and choosing a monitoring method in accordance with the length of the transport path.

Another technical problem in the present context is one of realizing the advantages that are associated with also monitoring the bit configuration of further information that is used in the switching equipment and which is different from but dependent on the address information contained in the first address-carrying section of the switch-external data cell.

It will be seen that another technical problem is one of realizing where a calculated check sum or estimated parity bits should be placed in a switch internal data cell provided with said additional information.

A technically concealed realization is found in the ability to understand the significance of allowing the additional information, added to the incoming data cell, to form a switch internal data cell, and to allow the address carrying first section of the switch-external data cell to be monitored for bit errors with the aid of a check sum or with the aid of parity bits, and also of realizing where said check sum or said parity bits shall be placed, or of realizing which polynomial shall be used to achieve adequate calculation of the check sum.

It will also be seen that a technical problem is one of realizing the significance of choosing an odd parity for monitoring the first section and an even parity for monitoring the remaining part of the data cell, or vice versa, and also of realizing which parts or sections within the data cell internal of the switching equipment shall be monitored with regard to parity of one of said kinds.

It will also be seen that a technical problem resides in the ability of realizing those advantages that are afforded when a bit error discovered in the second section can be "corrected" solely by isolating the source or by simplifying localization, and of realizing the means available to make such corrective supplementation.

In the case of switch internal coupling, a technical problem resides in realizing the advantages that are afforded, when discovering certain bit errors in the second section, by marking that the check sum or its parity bits belonging to the switch-internal data cell have been changed so that, despite a residual error, they still do not mark a bit error directly.

SOLUTION

The invention is based on the monitoring of bit errors in packet switching equipment included in a telecommunication system. A number of outgoing links are connected to the switching equipment via first switch ports and the switching equipment includes the control means and coupling means necessary for connecting incoming links with indicated outgoing links.

An outgoing link is pointed-out or indicated by signals that appear on an incoming link, these signals having the form of one or more data cells. Each data cell has a constant length and includes an address carrying first section or region and an information carrying second section or region, where the address-carrying section includes a first subsection for identification of a destination address, and a second subsection having a bit configuration which is adapted to discover the occurrence of bit errors in the first subsection through the agency of a selected polynomial.

With the intention of resolving one or more of the aforesaid technical problems, it is proposed in accordance with the present invention that the switching equipment is provided with a first means for discovering the occurrence of bit errors within the second information-carrying section. The switching equipment also includes second means which upon the discovery of a bit error function to note the error in a bit error noting unit. The first means, or unit, is intended to be able to supplement the second information-carrying section and/or to correct an occurrent bit error.

According to proposed embodiments which lie within the scope of the inventive concept, the second information-carrying section is monitored for bit errors with the aid of a check sum and a calculated check sum is placed within a region after the second section.

The aforesaid information-carrying section can also be monitored for bit errors with the aid of a plurality of parity bits which are either placed immediately after the second section or along said second section.

If additional information is used containing, among other things, switch internal routing and address information, this information can be monitored for bit errors with the aid of a check sum or with the aid of parity bits, wherein a calculated check sum or said parity bits is/are placed within a region after said additional information.

According to one particular feature of the invention, additional information and the address-carrying first section are monitored for bit error with the aid of a check sum and/or parity bits, wherein a calculated check sum is placed after the first address-carrying section within the second subsection, and the check sum is calculated with the aid of a polynomial of the formula $$x^8+x^2+x+1.$$

According to a further development of the invention, bit error monitoring is effected by monitoring a data cell with parity bits with parallel transmission of data cells, and by monitoring respective data cells with the aid of calculated check sums in the case of series transmission.

When practicing the present invention, it is preferred to use odd parity when monitoring a given section and even parity when monitoring the remaining part of the data cell, or vice versa. Odd parity can be used to monitor the first section and the additional information, and even parity can be used to monitor the remaining part of the data cell, or vice versa.

When a bit error is discovered in the second section, the error is rectified so as to isolate the error source or to simplify localization of the error. This can be achieved either by supplementing the bit error, or by correcting the check sum of the erroneous data cell or its parity bits, or by adding a bit to the data cell so as to indicate that the data cell check sum or its parity bits have been changed due to an earlier discovered bit error in the second section.

ADVANTAGES

Those advantages primarily afforded by an inventive arrangement intended for bit error monitoring in a switching equipment reside in the provision of conditions which improve monitoring of the performance of the connections and switching equipment and enable bit errors to be isolated and localized.

The control function within the switching equipment can be simplified by monitoring for bit errors in the information-carrying second section of the switch internal data cell.

This enables predictive error monitoring to be effected in a simple manner, by evaluating possible equipment degeneration.

The primary characteristic features of an inventive arrangement are set forth in the characterizing clause of claim 1.

BRIEF DESCRIPTION OF THE DRAWINGS

An exemplifying embodiment of preferred switching equipment and associated bit error monitoring devices will now be described in more detail with reference to the accompanying drawings, in which.

BEST MODES OF CARRYING OUT THE INVENTION

Figure 1:
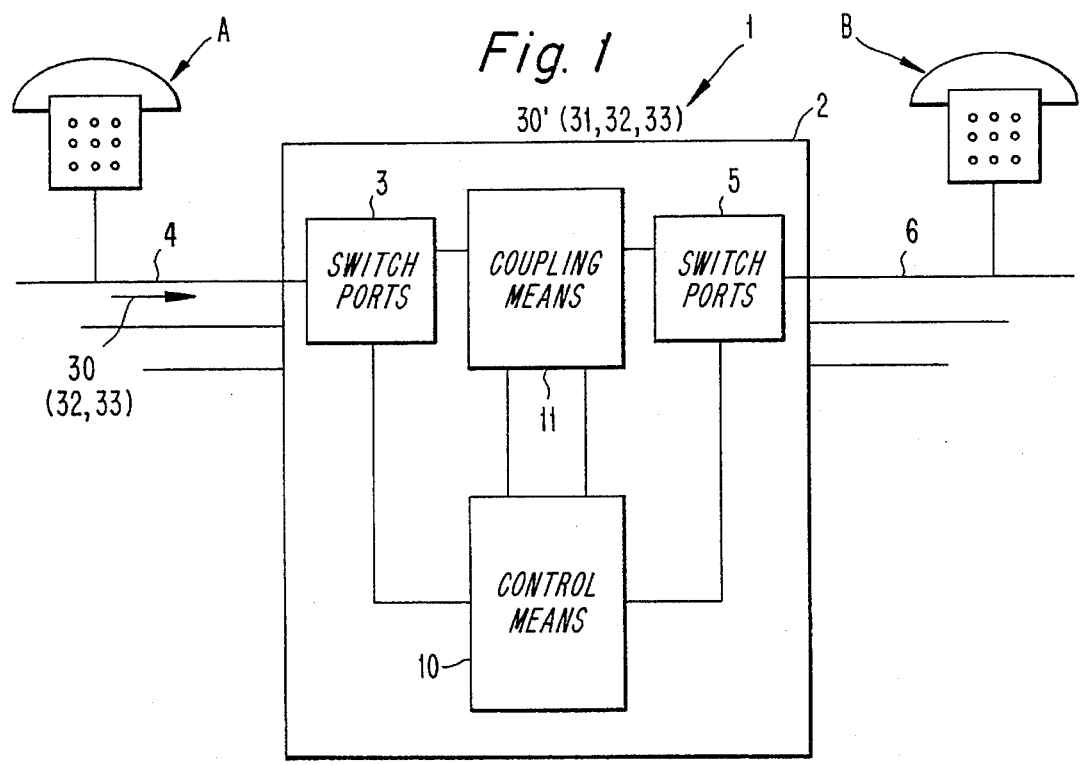
FIG. 1 illustrates in a highly generalized fashion ATM-type switching equipment which forms part of a telecommunication system.

FIG. 1 is a highly simplified illustration of switching equipment 2 forming part of a telecommunication system 1, said equipment being of the kind referred to as an ATM-switch ( Asynchronous Transfer Mode ).

The ATM-technique is earlier known and consequently it is not necessary to describe this technique in detail.

A number of incoming links 4 are connected to the switching equipment 2 via first switch ports 3, and a number of outgoing links 6 are connected to said equipment via second switch ports 5. The illustrated switch equipment 2 includes control means 10 and the coupling means 11 required to connect a link 4 with an indicated outgoing link 6, said outgoing link 6 being indicated, or pointed out, by signals in the form of one or more data cells (30) occurring on the incoming link 4.

These data cells 30 have a CCITT-standard, with 5 octettes in a header or address-carrying section 32 containing, among other things, a virtual destination address, and 48 octettes in an information section (Payload) or information-carrying section 33, containing the actual information.

According to one embodiment of the invention, additional information in the form of an additional bit configuration 1 shall be added to the switch-external data cell 30 in the first switch port 3, and that these extra bits are allocated a configuration, among other things in accordance with the address information in the data cell header 32, which causes the extra bits to be used solely internally in the switch equipment for controlling selected functions, instead of the bit configuration in the data cell header 32. These extra bits are removed in the second switch port 5, as shown more clearly in FIG. 2.

A more detailed description of the conditions under which this additional information is formed and used is given in Swedish Patent Application No. 92 03332-3 filed on the 9th Nov. 1992 under the title "Identification of Datapackets".

Figure 2:
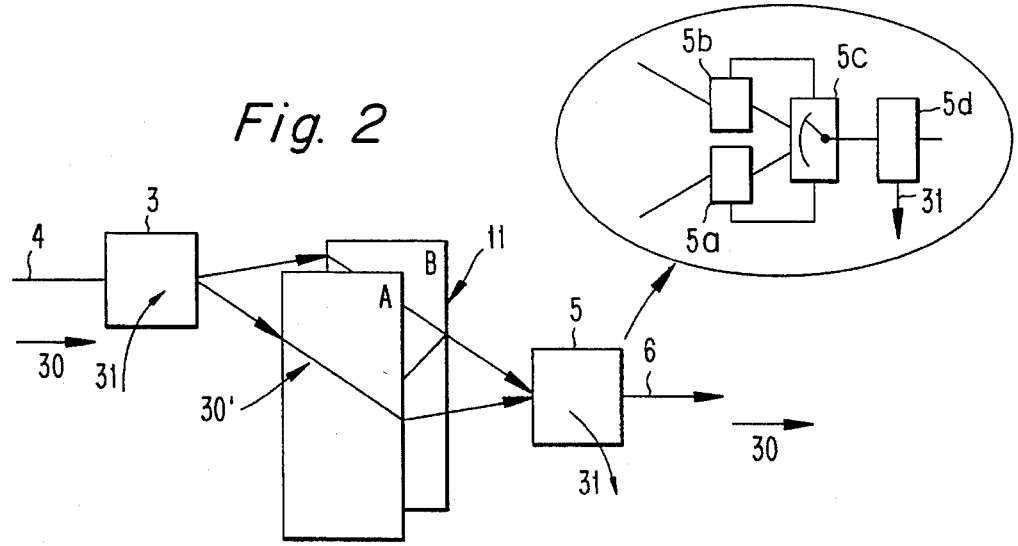
FIG. 2 illustrates in principle the introduction of an additional bit configuration at the input to the switching equipment and the removal of this additional bit configuration at the output of the switching equipment.

FIG. 2 is intended to show that additional information in the form of a section or a region 31 is added to an incoming switch-external data cell 30 in the switch port 3, so as to form a data cell 30' which is used internally in the switching equipment and that only this additional information or region 31 is removed in the switch port 5.

As will be seen from FIG. 2, the coupling devices 11 are duplicated with two switch arrays, referenced A and B switch planes, and that normally only one plane is chosen for the requisite through-connection.

Although two switch planes provides a high degree of system security, it will be understood that this security is still greater when more than two switch planes are used.

When a lower degree of system security can be accepted, only one switch plane need be used.

As illustrated in FIG. 2, the switch port 5 includes means 5a and 5b for checking the quality of the data cells. These means are able to carry-out quality checks, perform calculations in accordance with a given algorithm, be controlled by the bit configuration in the data cell, or determine current quality of the data cell in some other way, and also function to activate a switch 5c so as to select one of the switch planes A or B or both.

A unit 5d is provided for removing solely the additional or supplementary bit configuration 31.

Figure 3:
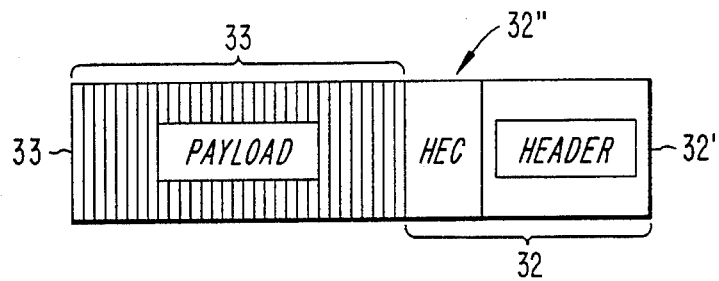
FIG. 3 illustrates a principle design of an earlier known and standardized switch-external data cell, a so-called ATM-cell.

FIG. 3 illustrates in principle the configuration or format of an earlier known standardized ATM-cell in a simplified design.

The first four octettes in the field 32' within the region or the first subsection 32 referenced Header accommodates the virtual destination address. A fifth octette within the second subsection or field 32'' within the first subsection or header 32 accommodates a check sum which is used to discover bit errors within the addressing section or field 32'. The check sum is referenced "HEC"(Header Error Control) and is the subject of a CCITT standardization. The following 48 octettes within the information-carrying section or region 33 contains user data and is referenced "Payload".

When the ATM-cell has the configuration or format illustrated in FIG. 3, a bit error within the addressing section or field 32' can be discovered with the aid of a check sum appearing within the second subsection or field 32'' this sum being an eight-bit check sum which can be generated by the polynomial $$x^8+x^2+x+1.$$

Upon the detection of a bit error in the field 32', all bits in the field are passed through a number of feedback shift registers, in a known manner. Single and double errors can be detected with the aid of these shift registers and the correction or rectification of single errors is effected in a known manner.

It is known to monitor the standardized ATM-cell for bit errors within the first subsection or field 32'.

The invention intends to improve monitoring of bit errors internally of the switch, by using a further check or control function which is based on the information content of the second information-carrying section or region 33 and to be delivered to respective data cells. This check sum is calculated on the information-carrying region of the cells, or Payloads, with a polynomial such as $$x^{10}+x^9+x^6+x^5+x+1.$$

This polynomial shall differ from tile polynomial used to calculate the check sum in the second subsection or field 32', as the information-carrying section or region 33 is much larger than the field 32'.

Figure 4:
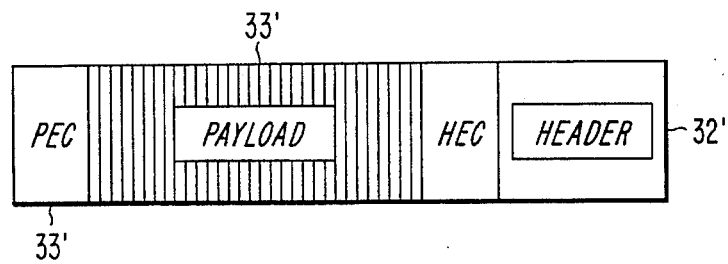
FIG. 4 illustrates a first embodiment of the format of a switch-internal data cell, where a calculated check sum concerning the information-carrying second section is placed behind said second section.

FIG. 4 illustrates an example of how a data cell can be structured with regard to the format internally of the switch, where the information-carrying section or region 33 is monitored for bit error with the aid of a calculated check sum. This applies primarily to longer transmission paths.

In this case, the check sum used to monitor bit error in the information region 33 has been placed immediately behind said region, within an own or individual region. The check sum in FIG. 4 is referenced PEC (Payload Error Control) and is allocated areas and control fields referenced 33'. These areas and fields have a size of ten bits.

Hardware advantages are gained when placing the check sum field 33' after the information region 33, according to FIG. 4, although the check field 33' may alternatively be placed in front of the information region 33. In this latter case, it is necessary to additionally buffer the data cell when generating the control field.

The above polynomial enables the check sum to detect single, double and triple areas in the control or check field. It cannot be used, however, to correct errors.

Figure 5:
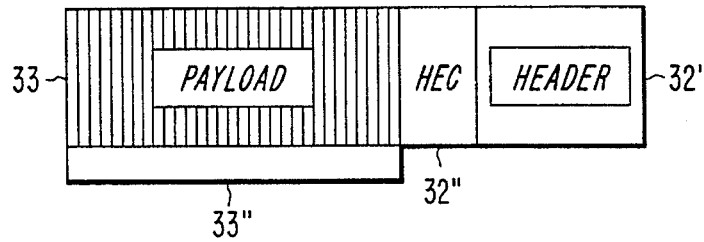
FIG. 5 illustrates a second embodiment of the format of a switch-internal data cell, where parity bits are used to discover bit errors within the information-carrying second section.

FIG. 5 is intended to illustrate an alternative data cell format, where it is judged that a check sum is too complex to handle and where the chosen transmission path is small. In this illustration, typical parity bits are supplied to the information-carrying field or region 33, within a region or field referenced 33".

The number of parity bits to be delivered will depend on the desired accuracy of the bit error detection.

In addition to placing the parity bits along the information region 33 in the manner shown in FIG. 5, the bits may be placed directly after the information region 33, similar to that shown in FIG. 4.

FIG. 5 is intended to exemplify that a parity bit has been added to each eighth bit in the information region 33.

A label routed ATM-switch will be supplied with switch-internal adapted routing information with each incoming switch-external ATM-cell, the nature and function of this information being described in more detail in the aforesaid Swedish patent application.

Figure 6:
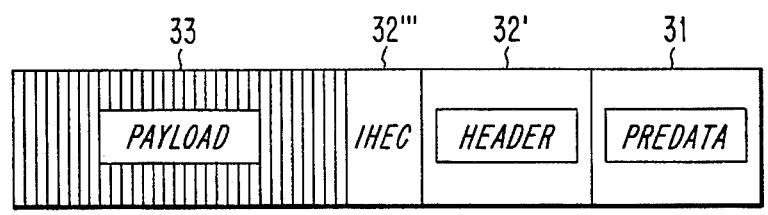
FIG. 6 illustrates a third embodiment of the format of a switch-internal data cell, where a check sum has been calculated for the bit configuration for the address-carrying first section of a switch-external data cell.

This information is comprised of a number of bits in a bit-configuration that shall be placed in a region referenced "Predata" 31 in front of each data cell, as illustrated in FIG. 6. Each data cell within the switching equipment contains information which discloses the output to which it shall be delivered.

Information other than routing information is also delivered to the data cells.

Since the aforesaid additional or supplementary bits or "Predata" within the region 31 are concerned with routing of the data cells, it is of the greatest importance that these bits are correct. Consequently, the bit configuration in region 31 it is preferred to also carefully monitored with regard to bit error.

This bit error monitoring process can be carried out in any one of a number of possible ways.

One method is to monitor the additional bits within the region 31 with the aid of a check sum and to calculate the check sum for the region 31 in the same manner as the field 32" is calculated for the region 32' in FIG. 3. In FIG. 6, this check sum has been referenced 32''' and is designated "IHEC".

Figure 7:
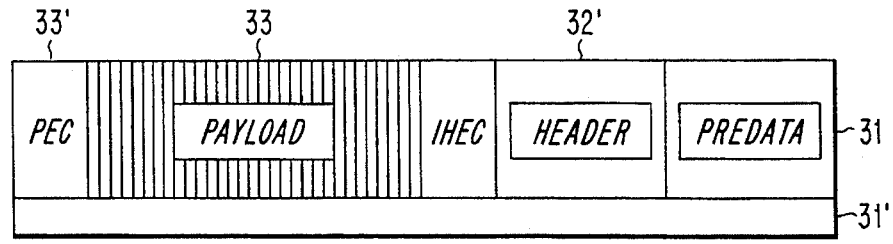
FIG. 7 illustrates a fourth embodiment of the format of a switch-internal data cell, where bit error monitoring is effected with the aid of parity bits for the whole data cell.

Another method is to monitor the region 31 with the aid of parity bits 31' in the manner illustrated in FIG. 7.

When it is necessary to keep down the number of bits supplied to the cells, another method is to monitor the region 31 and to combine the bit error monitoring of section 32' with monitoring of the region 31. Instead of calculating a check sum for the region 31 and a check sum for another region 32, there can be calculated a check sum which is common to both regions.

FIG. 6 illustrates the configuration of a data cell internally in the switch when the check sums have been calculated for both regions 31 and 32. The check sum is designated IHEC (Internal Header Error Control) and has been placed in the same position as the field HEC (32") of the ATM-cell. There is nothing to prevent the IHEC-field 32" from consisting of parity bits instead of a check sum.

Figure 8:
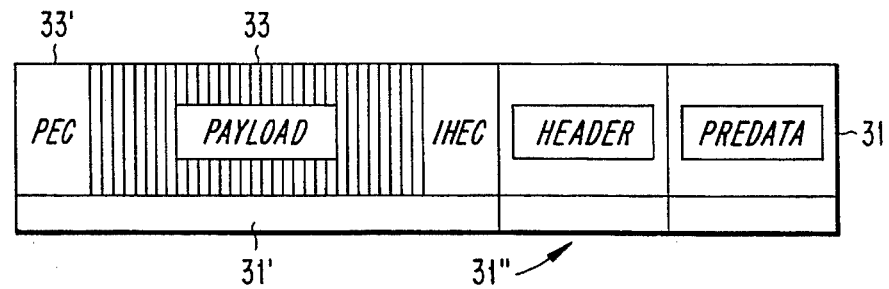
FIG. 8 illustrates a fifth embodiment of the format of a switch-internal data cell, where parity bits of odd or even parity are used.

It may be unnecessary to calculate check sums when transmitting internal related data cells between two closely adjacent hardware functions within switching equipment, such as check sums for the field 32" the field 32''' and the field 33'. In the case of short transmissions, which are advantageously effected in parallel format, bit error monitoring can be effected with normal parity instead, as shown in FIG. 7. Both FIG. 7 and FIG. 8 illustrate how parity bits can be delivered to cells in parallel format. Parity bits are used to monitor for bit error, despite the presence of a number of check sums in the cells.

Parity bits are supplied when converting from a series to a parallel format. One advantage with using both the field 32''' and the field 33' simultaneously is that the bit error controls or checks can be overlapped. On those occasions when the fields 32''' and 33' are to be calculated again, bit error supervision is maintained by the parity bits.

As illustrated, the check sum in field 32''' can be used to discover or find cell limits. In order to avoid needing to calculate this field 32''' for each circuit board subfunction, it is more beneficial for the cell to contain a signal which indicates the beginning of the cell. When there is interest in keeping down the width of the parallel format of the cell, the parity bits and the cell sync. signal can be combined. By using the odd parity 31" on the first subsection 32' and even parity on the remaining part of the data cell, there is obtained both a cell synchronizing signal and a bit error monitoring function with the aid of the parity, as will be seen more clearly from the FIG. 8 illustration.

Figure 9:
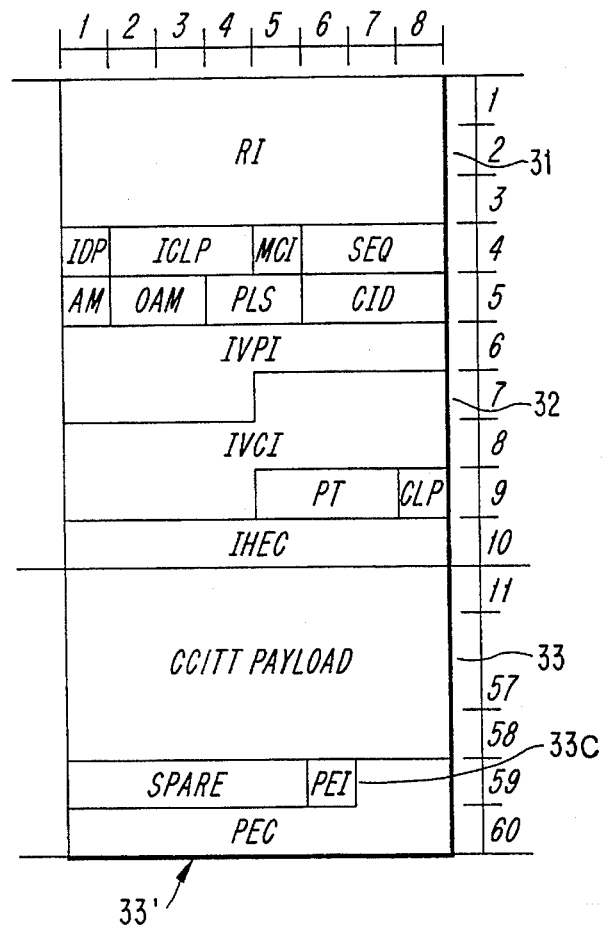
FIG. 9 illustrates an example of the format of a switch-internal data cell into which additional information has been inserted in accordance with FIG. 7.

FIG. 9 illustrates an example of a bit configuration in the regions 31, 32 and 33 of the internal data cell of switching equipment.

A basic rule is that when a bit error is discovered in the cell header 32 or the predata region 31, the erroneous or incorrect cell should be scrapped. This is done because bit errors in one of these fields can result in wrong routing of the cell on the other hand, the cell should be allowed to continue when a bit error is discovered in the information region 33. It is judged to be better for a user to receive data cells with bit errors in the information section than not to receive any cells at all.

Figure 10:
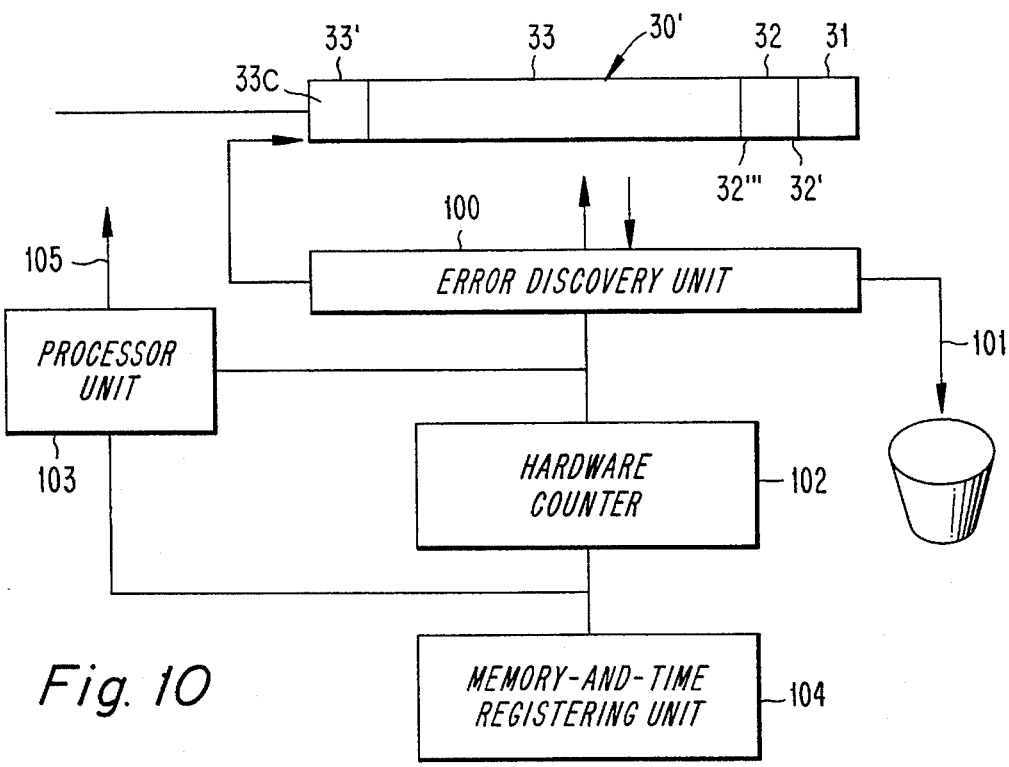
FIG. 10 is a block schematic of one possibility among several such possibilities of evaluating the occurrence of a bit error and of following one or more available procedures according to the nature of said error.

FIG. 10 is a block schematic which illustrates one possibility of evaluating occurrent bit errors, establishing where the bit error lies, and taking predetermined measures according to the nature and the location of the bit error, this possibility being one of many such possibilities.

Thus, FIG. 10 illustrates that an internal data cell 30' shall be tested to check for possible bit errors.

To this end, there is used an error discovery unit 100 of a kind which is known per se in principle. The unit has built-in functions and the choice of the function concerned is left to the skilled person to determine, among other things, on the basis of those properties that are illustrated and described in the publication "Error-Correcting-Code" Second Edition, 1972, by W. Wesley Peterson and J. E. Weldon, Jr., published by The Mill Press, Cambridge, Mass., U.S.A. and London, G.B.

The unit 100 may be constructed to evaluate bit errors in parity bit checks, or bit errors with the aid of a calculation effected with an unambiguously defined polynomial.

The unit 100 is constructed to scrap the data cell 30', via a conductor 101, when a bit error is discovered in the regions 31 and 32.

The unit is constructed to change the digital value within the field 33c, PEI (Payload Errors Identification), located within the region 33, when discovering a bit error in said region 33.

This discovery is registered in a hardware counter 102 and is transmitted to a processor unit 103.

The hardware counter 102 may be connected to a memory-and-time registering unit 104, thereby enabling a predictive bit error monitoring process to be effected via the process unit 103. Continuous information concerning the number of bit errors in the region 33 per unit of time can give information relating to the instantaneous standard of the equipment and to tendencies towards degeneration.

The processor unit 103 may also be constructed to transfer discovered bit errors to a superordinate processor, via a conductor 105, in accordance with the nature of the bit error.

If the bit error shall be corrected so as to give a correct bit configuration, the unit 100 is adapted to do this.

The error discovery unit 100 is also constructed to sense the field 33c(PEI) and when establishing that this field 33c(the PEI-field) indicates that a bit error is occurrent within the field 33, no signal is sent to the counter 102 or to the process unit 103.

Thus, it can be established that a bit error within the region 33 can be processed via the unit 100 in the following manner:

a) The bit error is calculated so that the rectified data cell will be correct.

b) The bit error is rectified so that the data cell check sum and/or parity bit check will be correct.

c) The bit error is not rectified and the field 33c is set to a state which indicates that a bit error is present.

d) The bit error is not rectified and the bit error monitoring facility is rendered inactive in some other way.

If rectification of the bit error is considered excessively demanding, the field 33' may instead be recalculated so that its content will coincide with the incorrect region 33.

The object of each rectification of a bit error or the procedures taken because of a bit error is that each subsequent bit error detecting unit shall not indicate data cells with incorrect fields 33' and therefore not evaluate or send an error report to the superordinate processor unit.

This enables the error to be isolated and the error source readily indicated, since the superordinate processor unit only obtains one single error report.

As previously mentioned, it is also possible to allow a bit 33c in the data cell to indicate whether or not the field 33 or 33' has been changed as a result of discovering a bit error. The information contained in this bit may be of interest when the switch has redundant switch planes, according to FIG. 2. A choice is made as to which data cells shall be allowed to continue, when combining the cells currents from the redundant switch planes. The unit that is to make the data cell choice can take into account whether or not a bit error has occurred in "Payload" or the region 33.

By selecting odd parity and even parity for different sections, the interface between these different sections can serve as a reference for synchronization pulses and the like.

It will be understood that the invention is not restricted to the aforedescribed and illustrated exemplifying embodiment thereof and that modifications can be made within the scope of the present invention as defined in the following claims.

We claim:

1. An arrangement for bit error monitoring in a telecommunication system comprising:

a plurality of first and second switch ports;

a plurality of incoming links connected to the first switch ports;

a plurality of outgoing links connected to the second switch ports;

switching equipment including a controller and coupler for coupling incoming links with outgoing links, wherein indication of an outgoing link is initiated by signals in the form of one or more data cells occurring on an incoming link, a plurality of data cells having a constant length containing a first address-carrying section and a second information carrying section, and wherein the address-carrying section includes a first subsection for identification of a destination address and a second subsection having a bit configuration for discovery of the occurrence of a bit error in the first subsection;

first means for discovering within the switching equipment bit errors that occur within said second information-carrying section;

second means which in the event of a bit error function to note the occurrent bit error in a bit error noting unit; and a unit which includes third means for at least one of supplementing said second information-carrying section and rectifying an occurrent bit error.

2. The arrangement of claim 1, wherein the second information-carrying section is monitored with regard to bit errors with the aid of a check sum.

3. The arrangement of claim 2, wherein a calculated check sum is placed after the second section.

4. The arrangement of claim 2, wherein odd parity is used to monitor the first section and also the supplementary information, and even parity is used to monitor the remaining part of the data cell, or vice versa.

5. The arrangement of claim 1, wherein the second information-carrying section is monitored with regard to bit error with the aid of a plurality of parity bits.

6. The arrangement of claim 5, wherein the parity bits are placed immediately after the second section.

7. The arrangement of claim 5, wherein the parity bits are placed along the second section.

8. The arrangement of claim 1, wherein supplementary information containing at least switch-internal routing and address information is monitored with regard to bit error with the aid of a check sum or with the aid of parity bits.

9. The arrangement of claim 8, wherein a calculated check sum or parity bits is/are placed after the supplementary information.

10. The arrangement of claim 8, wherein supplementary information and the first address-carrying section are monitored with regard to bit error with the aid of a check sum or with the aid of parity bits.

11. The arrangement of claim 1, wherein supplementary information and the first address-carrying section are monitored with regard to bit error with the aid of a check sum or with the aid of parity bits.

12. The arrangement of claim 11, wherein a calculated check sum is placed after the first address-carrying section.

13. An arrangement according to claim 12, wherein the check sum is calculated with the aid of a generator polynomial having the formula $$g(x)=x^8+x^2+x+1.$$

14. The arrangement of claim 1, wherein bit error monitoring is effected by monitoring respective data cells with parity bits, in the case of parallel transmission of data cells, and also with the aid of calculated check sums.

15. The arrangement of claim 14, wherein odd parity is used to monitor a selected section and even parity is used to monitor the remaining part of the data cell, or vice versa.

16. The arrangement of claim 1, wherein odd parity is used to monitor the first section and also the supplementary information, and even parity is used to monitor the remaining part of the data cell, or vice versa.

17. The arrangement of claim 1, wherein when establishing a bit error within at least one of the first section of a data cell and the supplementary information, the data cell having the bit error is scrapped.

18. The arrangement of claim 1, wherein when establishing a bit error in the second section, the bit error is corrected so as to isolate an error source or to simplify localization of the error.

19. The arrangement of claim 18, wherein the bit error is rectified by correcting a check sum or parity bits of the data cell having the bit error.

20. The arrangement of claim 19, wherein a bit is supplied to the data cell for indicating that the check sum of the data cell or its parity bits have been changed, due to an earlier discovered bit error in the second section.

21. The arrangement of claim 20, wherein the bit supplied is placed after the second section.

22. An arrangement for bit error monitoring in a telecommunication system comprising:

a plurality of first and second switch ports;

a plurality of incoming links connected to the first switch ports;

a plurality of outgoing links connected to the second switch ports;

switching equipment including a controller and coupler for coupling incoming links with outgoing links, wherein indication of an outgoing link is initiated by signals in the form of one or more data cells occurring on an incoming link, a plurality of data cells having a constant length containing a first address-carrying section and a second information carrying section, and wherein the address-carrying section includes a first subsection for identification of a destination address and a second subsection having a bit configuration for discovery of the occurrence of a bit error in the first subsection;

a first checksum for determining within the switching equipment bit errors that occur within the first subsection of the first address-carrying section;

a second checksum for determining within the switching equipment bit errors that occur with the second information-carrying section;

an error detector for noting a bit errors with aid of the first and second checksums; and a supplementing unit for rectifying the occurrence of a bit error in the second information carrying section.

23. The arrangement of claim 22, wherein the checksum corresponding to the second information-carrying section is calculated with the generator polynomial $$g(x)=x^{10}+x^9+x^6+x^5+x+1.$$

* * * * *